(12) United States Patent
Gruler et al.

(10) Patent No.: US 9,650,001 B2
(45) Date of Patent: May 16, 2017

(54) BATTERY ARRANGEMENT FOR OPERATING ELECTRICAL LOADS IN A VEHICLE FOR TRANSPORTING HAZARDOUS MATERIALS

(71) Applicant: CONTINENTAL AUTOMOTIVE GMBH, Hannover (DE)

(72) Inventors: Martin Gruler, Aldingen-Aixheim (DE); Thomas Grill, Villingen-Schwenningen (DE); Rainer Wehrlein, Bad Duerrheim (DE)

(73) Assignee: Continental Automotive GmbH, Hannover (DE)

( * ) Notice: Subject to any disclaimer, the term of this patent is extended or adjusted under 35 U.S.C. 154(b) by 22 days.

(21) Appl. No.: 14/426,060

(22) PCT Filed: Sep. 2, 2013

(86) PCT No.: PCT/EP2013/068049
§ 371 (c)(1),
(2) Date: Mar. 4, 2015

(87) PCT Pub. No.: WO2014/037292
PCT Pub. Date: Mar. 13, 2014

(65) Prior Publication Data
US 2015/0232048 A1 Aug. 20, 2015

(30) Foreign Application Priority Data
Sep. 6, 2012 (DE) .......................... 10 2012 215 846

(51) Int. Cl.
*H02J 7/00* (2006.01)
*H02H 9/00* (2006.01)
(Continued)

(52) U.S. Cl.
CPC .......... *B60R 16/033* (2013.01); *H02J 7/0031* (2013.01); *H02J 2007/004* (2013.01)

(58) Field of Classification Search
CPC ........ B60R 16/033; H02J 7/0031; H02J 7/047
(Continued)

(56) References Cited

U.S. PATENT DOCUMENTS

| 4,795,914 A | 1/1989 | Higa et al. |
| 5,204,992 A * | 4/1993 | Carpenter ............. H02J 7/0031 307/10.7 |

(Continued)

FOREIGN PATENT DOCUMENTS

| DE | 4211578 C1 | 4/1993 |
| DE | 19517742 A1 | 11/1996 |

(Continued)

*Primary Examiner* — M'Baye Diao
(74) *Attorney, Agent, or Firm* — Cozen O'Connor (57) ABSTRACT

A battery arrangement for electrical loads in a vehicle for transporting hazardous waste includes: a battery having at least a first terminal, electrically connectable to an electrical load; a first electrical resistor electrically connected in series to the battery and a second terminal, the second terminal being electrically connectable to the electrical load; and a switch component connected electrically in parallel to the first electrical resistor and connected electrically to the battery. The switch component is controlled such that a first voltage applicable to a third terminal and having a value exceeding a specifiable value closes the switch component and the first resistor is short-circuited. When the applicable first voltage falls below the specifiable value, the switch component opens and the short-circuit is broken.

14 Claims, 4 Drawing Sheets

(51) Int. Cl.
*B60R 16/03* (2006.01)
*B60R 16/033* (2006.01)

(58) Field of Classification Search
USPC .............. 320/134, 127; 361/54; 307/10.7
See application file for complete search history.

(56) References Cited

U.S. PATENT DOCUMENTS

| | | | | |
|---|---|---|---|---|
| 6,130,813 | A * | 10/2000 | Kates | H02H 9/001 |
| | | | | 307/80 |
| 7,166,990 | B2 * | 1/2007 | Lo | H02J 7/0031 |
| | | | | 307/10.7 |
| 7,282,809 | B2 * | 10/2007 | Melis | B60L 11/1805 |
| | | | | 307/9.1 |
| 7,589,500 | B2 * | 9/2009 | Johnson | B25F 5/00 |
| | | | | 320/114 |
| 7,952,330 | B2 * | 5/2011 | Mori | H01M 2/34 |
| | | | | 320/144 |
| 8,344,555 | B2 * | 1/2013 | Ichikawa | B60K 6/445 |
| | | | | 307/10.1 |
| 8,558,712 | B2 * | 10/2013 | Fechalos | H01M 10/482 |
| | | | | 320/116 |
| 8,922,133 | B2 * | 12/2014 | Hausman, Jr. | H02M 5/293 |
| | | | | 315/173 |
| 9,263,900 | B2 * | 2/2016 | Ju | H02J 7/0029 |
| 2003/0120183 | A1 * | 6/2003 | Simmons | A61F 4/00 |
| | | | | 600/595 |
| 2007/0247112 | A1 * | 10/2007 | Yu | H01M 2/1016 |
| | | | | 320/112 |

FOREIGN PATENT DOCUMENTS

DE        19939987 C1    1/2001
EP         1544050 A1    6/2005

* cited by examiner

BATTERY ARRANGEMENT FOR OPERATING ELECTRICAL LOADS IN A VEHICLE FOR TRANSPORTING HAZARDOUS MATERIALS

CROSS-REFERENCE TO RELATED APPLICATIONS

This is a U.S. national stage of application No. PCT/EP2013/068049, filed on 2 Sep. 2013, which claims priority to the German Application No. DE 10 2012 215 846.4 filed 6 Sep. 2012, the content of both incorporated herein by reference.

BACKGROUND OF THE INVENTION

1. Field of the Invention

The present invention relates to a battery arrangement suitable for operating electrical loads in a vehicle configured to transport dangerous goods, i.e., hazardous materials.

2. Related Art

For the transport of dangerous goods by a vehicle, the specific regulations in accordance with the European Agreement concerning the International Carriage of Dangerous Goods by Road (ADR) or the German Regulation on the Carriage of Dangerous Goods by Road (GGVS) apply. A requirement set forth in these regulations consists in that, in devices which are used as electrical loads in a so-called ADR/GGVS vehicle, when switching of the starting or when actuating an emergency switch after a preset time (for example 3 seconds), no energy source should be active anymore or only an energy source with a low power. Generally, current is supplied to the electrical loads via an electrical system of the ADR/GGVS vehicle that is completely separated from the vehicle battery with the aid of power relays when starting is switched off or on actuation of an emergency switch. As a result, a deenergized state of the entire vehicle is intended to be ensured. In this regard, to a large extent battery-operated devices are dispensed with in ADR/GGVS vehicles.

However, devices such as tachographs, telematic devices, toll devices and event data recorders, which require a basic power supply to maintain a data buffer store or an integrity monitoring system, for example, have device-internal batteries, which can be connected to the electrical system of the ADR/GGVS vehicle for electrical charging.

For the case where the ADR/GGVS vehicle is switched so as to be deenergized, it is of particular importance in the case of such battery-operated devices that safe switchover to an internal battery operation can take place without the requirements of the ADR/GGVS being infringed in the process. In this regard, solutions are already known in which the switchover to the battery operation, for example in order to prevent data losses during data storage, and the switchover to a voltage source with a low power, for example for data buffering, as can occur on actuation of a (vehicle) battery switch disconnector, are subject to a time delay, in software-controlled fashion. The switchover systems used for this purpose use additional electronics and/or software and are complex in respect of the need for monitoring the function of said switchover systems.

Typically, the mentioned switchover systems are installed at the outset in all electrical loads with an internal battery, although the use of the switchover systems, corresponding to the purpose, in ADR/GGVS vehicles only makes up a very low percentage. This therefore results in unnecessary added expense in respect of corresponding electrical loads.

SUMMARY OF THE INVENTION

An object on which the present invention is based consists in providing an arrangement with which an inexpensive power supply, which conforms to ADR/GGVS, to electrical loads is ensured in vehicles that carry dangerous goods.

The battery arrangement according to an aspect of the invention for electrical loads in a vehicle for the carriage of dangerous goods comprises a battery, which has at least one first connection, which is electrically connectable to an electrical loads, a first electrical resistor, which is connected electrically in series with the battery and a second connection, wherein the second connection is electrically connectable to the electrical load. Furthermore, the battery arrangement includes a switch component part, which is connected electrically in parallel with the first electrical resistor and is electrically connected to the battery and which is controlled in such a way that a first voltage which can be applied at a third connection and which exceeds a presettable value closes the switch component part so that the first resistor is short-circuited. In the case of a first voltage which can be applied which falls below the presettable value, the switch component part opens so that the short circuit is canceled.

When the first voltage is present at the third connection, which first voltage is made available, for example, by a voltage source of a vehicle, for example by a car battery or a generator, the switch component part can close. In this process, a switching operation of the switch component part should be voltage-dependent or voltage-controlled, i.e., the switch component part only closes when the first voltage has exceeded the preset value or a threshold voltage or opens when the first voltage has undershot the preset value or a threshold voltage.

For the battery arrangement, in each case different switch component parts each having different threshold voltages can be provided.

If a first voltage is present that has exceeded the threshold voltage, the switch component part is closed, wherein the first resistor is short-circuited or bypassed. In this state, the first voltage is supplied to the electrical load from the voltage source of the vehicle, wherein the first voltage is then also present at the first connection, to which the electrical load is electrically connected. In this case, the first voltage can form as a voltage drop across the battery, with the result that a comparatively high charging current flows there, which charging current charges the battery, which is in the form of a rechargeable battery.

In the case of the loss of the first voltage at the third connection, for example as a result of disconnection from the voltage source of the vehicle, the switch component part opens so that the short circuit of the first resistor is canceled. In the process, there is also no longer a first voltage present at the first connection since there is also no longer a first voltage present at the electrical load, with the result that the battery takes on the function of supplying a voltage to the electrical load connected to the first connection and to the second connection by the provision of a third voltage. In this case, a discharge current can flow from the battery to the electrical load, which discharge current is limited by the first resistor so that ADR/GGVS-compliant current and power limitation can be realized. Therefore, after the loss of voltage source of the vehicle, voltage can safely be supplied to the electrical load, for example a tachograph, depending on the intended use. In addition, by virtue of the battery arrangement, the supply to a clock, a data buffer store and/or an integrity monitoring system of the electrical load, for example, can also be ensured after disconnection of the first voltage.

Owing to the fact that the battery arrangement contains all of the elements necessary for supplying the third voltage provided by the battery to an electrical load such as, for example, a tachograph, a telematics device, a toll device and/or an event data recorder even in the event of the loss of the first voltage supplied by the voltage source of the vehicle, no further circuit measures are required in the electrical load, i.e., in the device itself, which reduces device costs.

The switch component part may be a semiconductor switching device, preferably a MOSFET (metal-oxide semiconductor field-effect transistor), which is preferably in the form of a voltage-controlled n-channel MOSFET, in which the first voltage is present at a gate contact. The n-channel MOSFET is suitable in particular to this extent as switch component part because the latter only switches in voltage-dependent fashion in the case of a voltage present at the gate contact and in the process permits a current flow from a drain contact to a source contact.

Expediently, the switch component part can have contacts, of which a first contact is in the form of a gate contact, a second contact is in the form of a source contact and a third contact is in the form of a drain contact. Since a MOSFET can be actuated with a low level of energy owing to the voltage control, the required disconnection can take place passively, for example by discharge of an RC element, in an ADR/GGVS-compliant manner and with a disconnection delay for data security. Passive components simplify the ADR/GGVS suitability owing to the low level of complexity of passive components.

However, other semiconductor switching devices, such as, for example, bipolar transistors, can also be used as a switch component part.

In one embodiment of the battery arrangement, a delay element for delaying a switching operation of the switch component part can be provided. This delay element can be connected electrically in series between the first contact of the switch component part and the third connection. In this case, the delay element can be embodied in such a way that in the case of a loss of the first voltage, a second voltage is provided which is present at the first contact and is reduceable after a presettable time. For this purpose, a storage element for storing the first voltage can be provided in the delay element, which storage element is in the form of an electrical capacitor, for example, which is discharged in the case of the loss of the first voltage and in the process provides the second voltage. For the duration of the discharge of the capacitor, i.e., the second voltage is present at the first contact, the switch component part remains closed. Owing to the use of a potentiometer, which is electrically connected to the capacitor in such a way that the discharge current thereof can be varied, the duration of the discharge can be set. Accordingly, a switching operation of the switch component part can be subject to a time delay, which ensures that, for the duration of the presettable time, during which time the first resistor remains short-circuited, a high discharge current of the battery can flow. The loss of the first voltage can be recorded by the electrical load so that, for example, a disconnection mechanism can be initiated, by which the electrical load is switched over to a current or voltage supply by the battery arrangement. This is advantageous since the duration of a switching time delay of the switch component part which is brought about by the delay element can be used in order to be able to securely store data of the electrical load, for example.

A further advantage of the delay element can consist in that, for the duration of the switching time delay, no undesired voltage peaks occur, as may occur in the case of abrupt switching operations, for example in the case of the loss of the voltage source, such as, for example, in the case of the electrical system of a vehicle being deenergized owing to load shedding. The switching delay should be selected such that, for example, the data of the electrical load can be stored and the maximum permissible time preset according to the ADR/GGVS regulations is not exceeded.

It is furthermore advantageous that the reduction in the second voltage provided by the delay element can be set after a presettable delay time T of the delay element, as a result of which the switching time delay of the switching operation of the switch component part can be defined precisely.

Expediently, the delay element can be in the form of an RC element, in which a second electrical resistor (R) is connected electrically in series between the third connection and the first contact, and the electrical capacitor (C) is connected electrically in parallel with the first contact of the switch component part. While the first voltage is present at the third connection, the capacitor can be charged in the RC element. In the case of a loss of the first voltage, the capacitor can be discharged and, in the process, provides the second voltage, which is present at the first contact of the switch component part. In this case, the capacitor can be discharged by the second electrical resistor and/or by the switch component part, wherein the second voltage is reduced after the preset delay time T. The delay time T, i.e., the discharge duration of the RC element, is in this case calculated in accordance with the general calculation principles for RC elements in the case of DC operation. In this case, the time constant $\tau$ (tau) of the RC element is calculated from the product of the resistance of the resistor (R) and the capacitance of the capacitor (C), wherein, for example, the delay time T is calculated up to half an exponential discharge of the RC element, i.e., the halftime of the discharge of the RC element, from the product of $\tau$ and the logarithm 2. If the second voltage falls below the preset value, which corresponds to the threshold value for the switching operation of the switch component part at the first contact, the switch component part opens and cancels the short circuit of the first resistor.

In order to prevent a current flow from the capacitor of the RC element in the direction of the third connection or into the electrical system, which is electrically connected via the third connection, in the case of a loss of the first voltage, a diode, such as a blocking diode, for example, can be connected electrically in series between the third connection and the delay element, which diode blocks the electrical current flow in the direction of the third connection and allows current flow in the opposite direction. In particular in the case of a low-resistance disconnection, the diode arranged in the mentioned position is advantageous since the RC element would otherwise be discharged via the third connection in an undesired manner.

Generally, the vehicle electrical distribution system voltage in ADR/GGVS vehicles is 12 V or 24 V. The voltage of the abovementioned battery can have a voltage that is device-specific and is independent of the vehicle electrical distribution system voltage, and this voltage may be, for example, 3.6 V for lithium batteries/rechargeable batteries.

In order to protect against deep discharge, the battery can have deep discharge protection, which disconnects the battery or the battery arrangement at least from the electrical load in such a way that it is no longer possible for current to flow from the battery to the electrical load. The deep discharge protection can be realized, for example, with a second n-channel MOSFET, which is connected in series between the battery and the first connection of the battery arrangement, for example, wherein the gate contact of the MOSFET is electrically connected to the battery. If the voltage of the battery falls below a value which corresponds to a threshold value for a switching operation of the second n-channel MOSFET during battery operation, the second n-channel MOFSET blocks the current flow from the battery to the electrical load, wherein the battery cannot be discharged any further.

In a further embodiment of the battery arrangement, a separate charging element is provided, which is connected electrically in parallel with the battery and has an additional electrical connection to a node between the third connection and the first contact. The battery can be charged via this electrical connection even when the connection to the electrical load has already been disconnected by the deep discharge protection, for example.

For the ADR/GGVS-compliant current and power limitation, the electrical resistor should have at least a rated resistance of 100 ohms for the case where the battery is in the form of a 3.6 V voltage source. The rated resistance should preferably be dimensioned corresponding to the ADR/GGVS regulations. In this case, the value of the resistance of the resistor is dependent on the voltage, the current and a prescribed temperature during operation according to the regulations, for example during loading and unloading of dangerous goods.

The battery arrangement should be arranged or integrated with all of its elements, namely the battery, the switch component part and the first resistor, in a housing, preferably in a cast plastic shell. In addition, it may be advantageous if the delay element is likewise integrated in the housing. In addition, the housing should have at least in each case one outer contact element of the first connection, the second connection and the third connection, wherein the outer contact elements of the first connection and the second connection are connectable to the electrical load and the outer contact of the third connection can be connectable to the voltage source of the vehicle. Therefore, the battery arrangement can be considered to be a separate ADR/GGVS current/voltage supply. The battery arrangement therefore constitutes an ADR/GGVS-compliant module, which can be retrofitted in any battery-operated device or can be installed as rechargeable battery without changes to the device being required. This is particularly advantageous since the development costs and the complexity involved in authorizations in respect of ADR/GGVS compliance of the mentioned devices or electrical loads can be reduced.

An electrical system for a vehicle for the carriage of dangerous goods comprises at least one electrical load, a voltage source of the vehicle and the above-described battery arrangement, wherein at least the first connection and the second connection are connected electrically to the electrical load and the third connection is connected to the voltage source of the vehicle. In this case, it is advantageous that, with the mentioned electrical system, current or voltage can be supplied immediately to a plurality of electrical loads in the case of the loss of the first voltage from a single battery arrangement of the described type. For this purpose, the battery arrangement can be positioned with good accessibility in a central position in the ADR/GGVS vehicle and therefore can ensure a supply of current to electrical loads which are installed in the vehicle with poor accessibility. Taking into consideration the ADR/GGVS compliance, diodes which block the current flow from the electrical load or from the battery arrangement into the electrical system should be arranged in the electrical loads. A further advantage consists in that the electrical loads used in such an electrical system can be constructed so as to be much smaller owing to the lack of a separate housing for the battery arrangement.

In a method for operating the battery arrangement of the type described above, the first voltage provided by the voltage source for supplying power to the electrical load is applied to the third connection. In this case, the switch component part is closed, wherein the first resistor is short-circuited, with the result that the first voltage present at the first connection forms as a voltage drop across the battery, wherein the battery is electrically charged. This is possible since an internal circuit is provided in the electrical load, by which circuit the first voltage can be applied to the first connection of the battery arrangement.

In the case of the loss of the first voltage, the switch component part is opened and the short circuit at the first resistor is canceled. In the process, the battery provides a third voltage, with the result that a current flows which is limited by the first resistor and is supplied to the electrical load.

In the case of the loss of the first voltage, for example in the case of deenergization of the vehicle, the method ensures safe switchover to the voltage or current supply with the described battery arrangement. As a result, clocks, data buffer stores or an integrity monitoring system of the electrical load, for example, can continue to be operated without any data losses.

BRIEF DESCRIPTION OF THE DRAWINGS

The present invention will be explained in more detail below with reference to an exemplary embodiment in conjunction with FIGS. 1A to 3, in which.

DETAILED DESCRIPTION OF THE PRESENTLY PREFERRED EMBODIMENTS

Figure 1A:
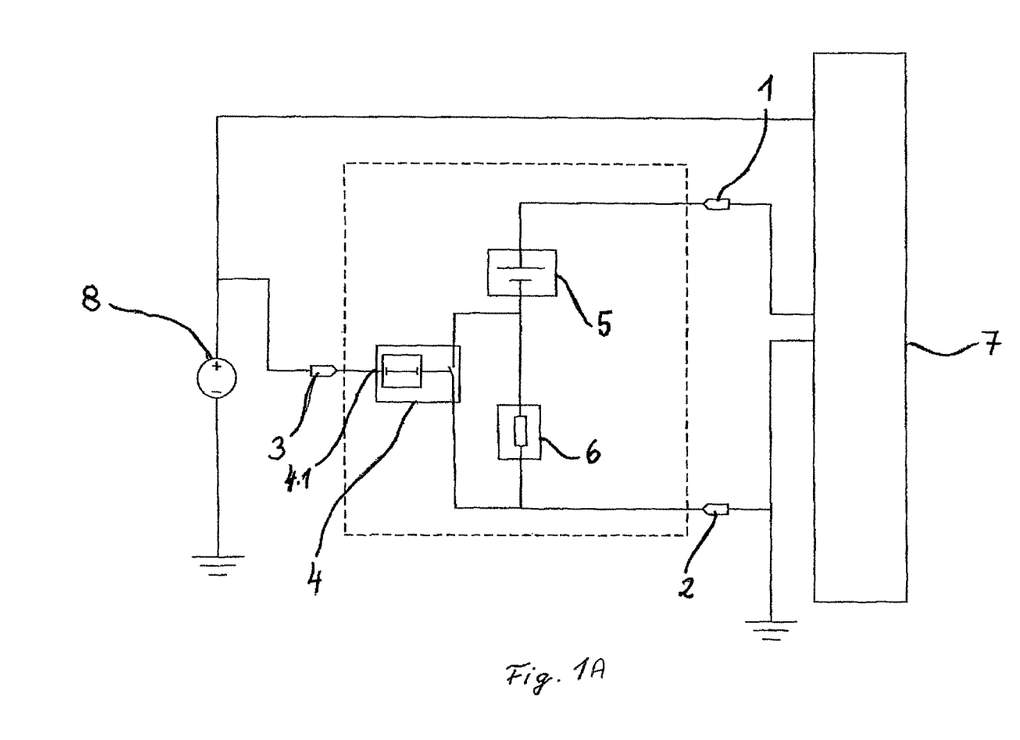
FIG. 1A shows an exemplary circuit of the battery arrangement.

FIG. 1A shows a schematic illustration of an exemplary circuit of the battery arrangement for an electrical load 7 in a vehicle for the carriage of dangerous goods. The battery arrangement comprises a battery 5, which has a 12 V rated voltage and at least one first connection 1, which is electrically connected to the electrical load 7, and a first electrical resistor 6, which is connected electrically in series with the battery 5 and a second connection 2, wherein the second connection 2 is electrically connected to the electrical load 7. Furthermore, the battery arrangement comprises a switch component part 4, which is connected electrically in parallel with the first electrical resistor 6 and is electrically connected to the battery 5.

As furthermore illustrated in FIG. 1A with the dashed border, the battery arrangement forms a separate unit, wherein the battery 5, the switch component part 4 and the first resistor 6 are arranged in a common housing in the present example. In the present case, the housing is formed by a cast plastic shell, in which the abovementioned elements are integrated. In this case, the housing has in each case at least one outer contact element of the first connection 1, the second connection 2 and the third connection 3.

FIG. 1A also illustrates an electrical system of the vehicle, to which the electrical load 7 is electrically connected. The electrical system is electrically connected to a voltage source 8, which in the present case is in the form of a car battery with a rated voltage of 12 V.

The switch component part 4 in the present exemplary embodiment is a semiconductor switching device, which is in the form of a voltage-controlled n-channel MOSFET, wherein the first voltage provided by the voltage source 8 is present at the gate contact of said MOSFET, which is indicated by the reference sign 4.1 in FIG. 1A. In this case, a threshold voltage forming as a voltage drop across the gate contact and source contact is exceeded, with the result that a current flow from a drain contact to the source contact takes place. In this way, the n-channel MOSFET switches such that the first resistor 6 is short-circuited or bypassed. In this case, the first voltage which is present at the first connection 1 alone can form as a voltage drop across the battery 5, with the result that a comparatively high charging current can flow there, which charges the battery 5.

In the case of the loss of the first voltage at the third connection 3, for example owing to disconnection of the voltage source 8 of the vehicle, there is no longer a voltage present at the gate contact of the n-channel MOSFET or the voltage at the gate contact is below the threshold voltage. In this case, it is no longer possible for current to flow from the drain contact to the source contact of the n-channel MOSFET, with the result that the MOSFET turns off so that the short circuit of the first resistor 6 is canceled. Since in this case there is also no longer a first voltage present at the first connection 1, the battery 5 performs the function of supplying voltage to the electrical load 7, which is connected to the first connection 1 and the second connection 2, by the provision of a third voltage, which corresponds to the rated voltage of the battery 5. The discharge current flowing in this case is limited by the first resistor, which is rated at 400 ohms, with the result that an ADR/GGVS-compliant current limitation to approximately 30 mA can be realized.

Figure 1B:
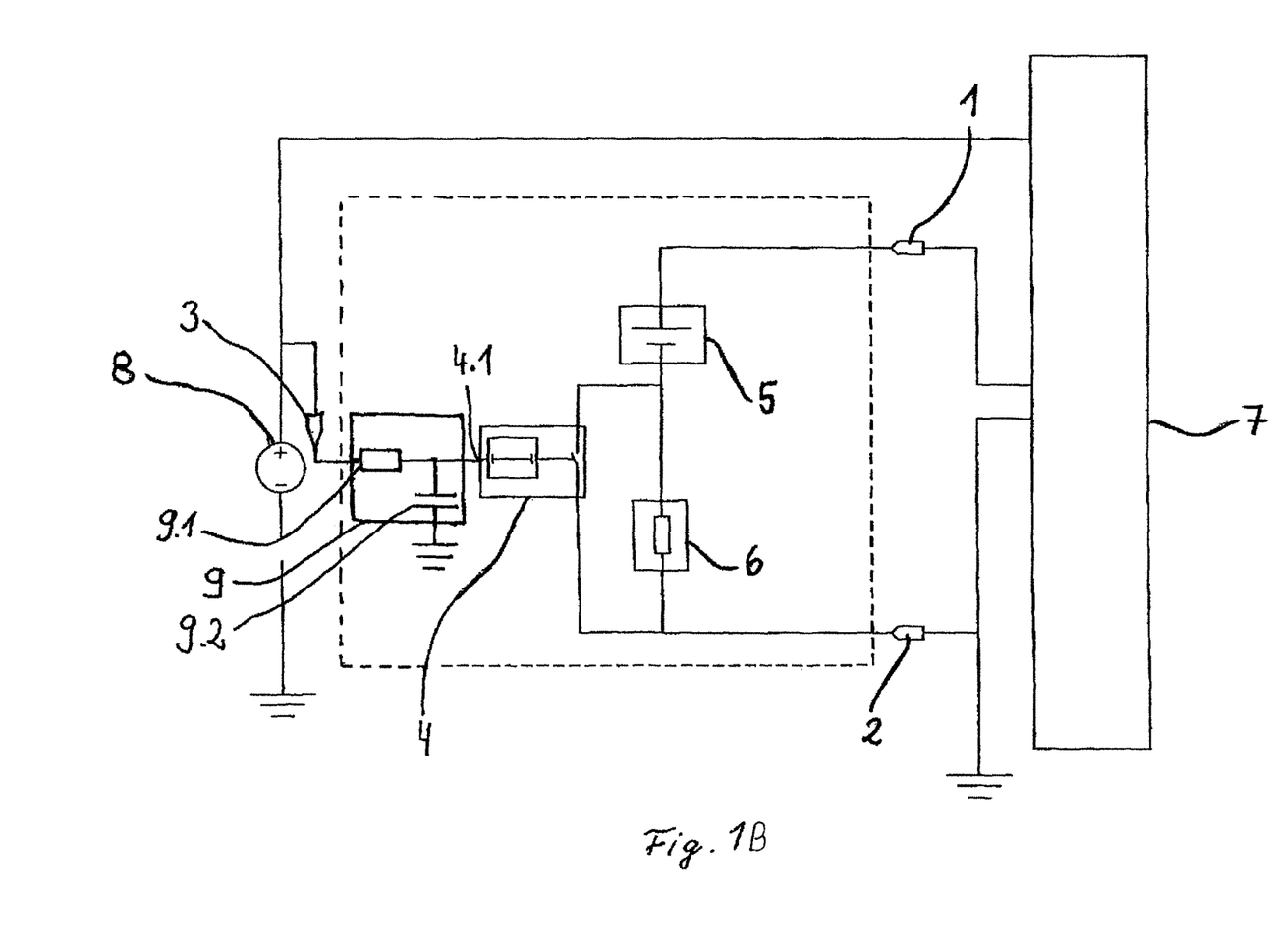
FIG. 1B shows an exemplary circuit of the battery arrangement with delay element.

In a further embodiment, which is illustrated schematically in FIG. 1B, a delay element 9 is connected in series between the contact 4.1, i.e. between the gate contact of the n-channel MOSFET, and the third connection 3. In this case, the delay element 9 is in the form of an RC element, in which a second electrical resistor 9.1 is connected electrically in series between the third connection 3 and the first contact and an electrical capacitor 9.2 is connected electrically in parallel with the first contact 4.1 of the switch component part. While the first voltage is present at the third connection, the capacitor 9.2 is charged. In the case of the loss of the first voltage, the capacitor 9.2 is discharged and, in the process, provides the second voltage, which is present at the first contact 4.1 of the switch component part 4. Correspondingly, the capacitor 9.2 is discharged by the switch component part 4. In the process, a switching delay of the n-channel MOSFET is achieved since said MOSFET only switches, i.e. only blocks the current flow from the drain contact to the source contact, when the voltage at the gate contact has reached a value below the threshold voltage.

In this embodiment it is advantageous that a diode is connected electrically in series between the third connection 3 and the second resistor 9.1, i.e. upstream of the delay element 9, which diode blocks an electrical current flow in the direction of the third connection 3.

As regards the battery 5, various embodiments of the battery arrangement can be selected, wherein the battery 5 can have different rated voltages which are device-specific and which are independent of the vehicle electrical distribution system voltage. In the preferred embodiment, the battery 5 has a rated voltage of 3.6 V.

Figure 2:
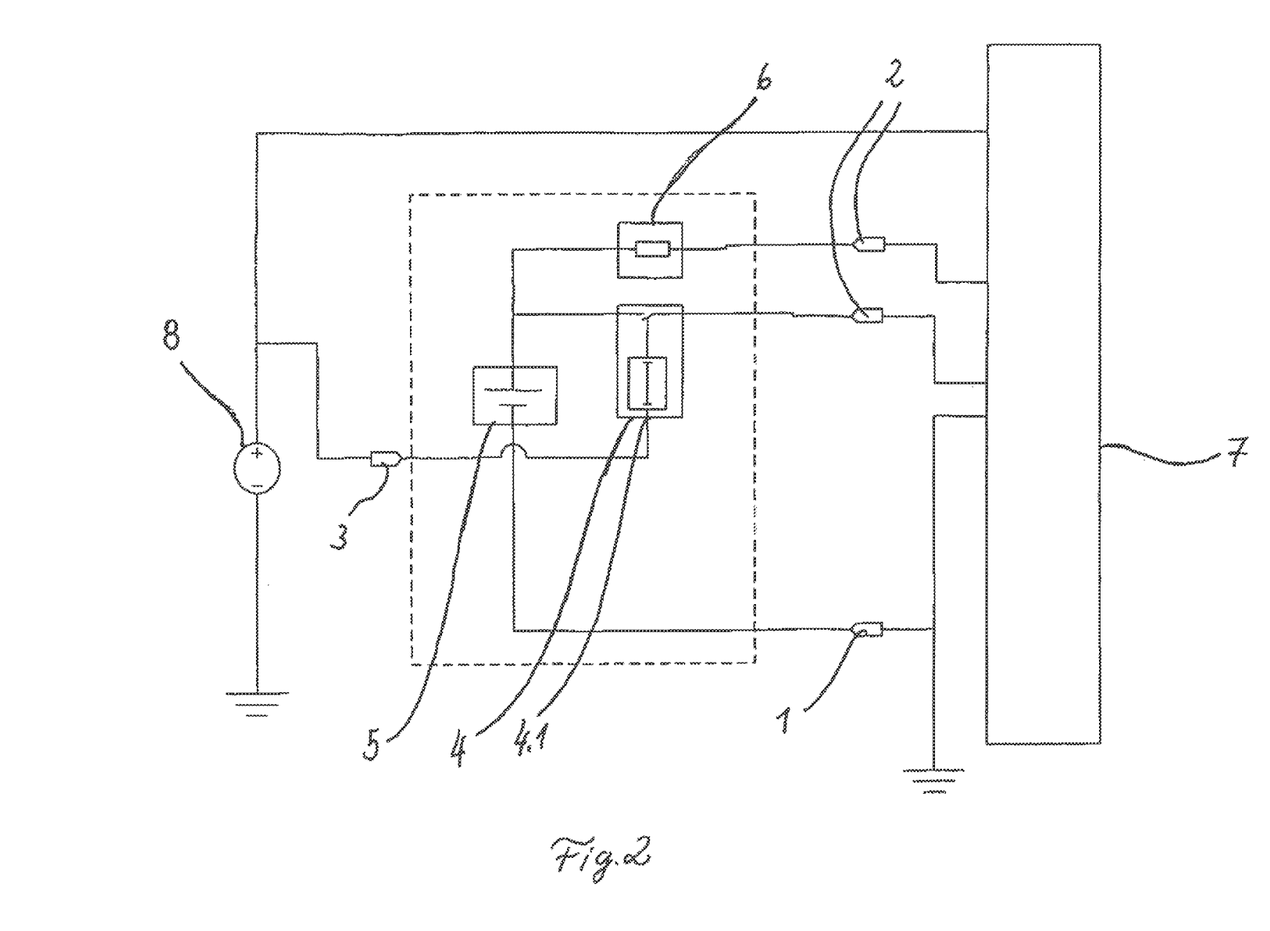
FIG. 2 shows a second exemplary circuit of the battery arrangement.

The circuit illustrated schematically in FIG. 2 substantially corresponds to the features of the circuit shown in FIG. 1A, with the difference that the first resistor 6 and the switch component part 4 each have a separate second connection 2 and the polarization of the battery 5 is inverted with respect to the battery 5 shown in FIG. 1A. The uninterrupted circuit, i.e. the circuit supplied by the battery 5, is functionally and electrically isolated from the switched circuit, i.e. the electrical system of the vehicle.

Figure 3:
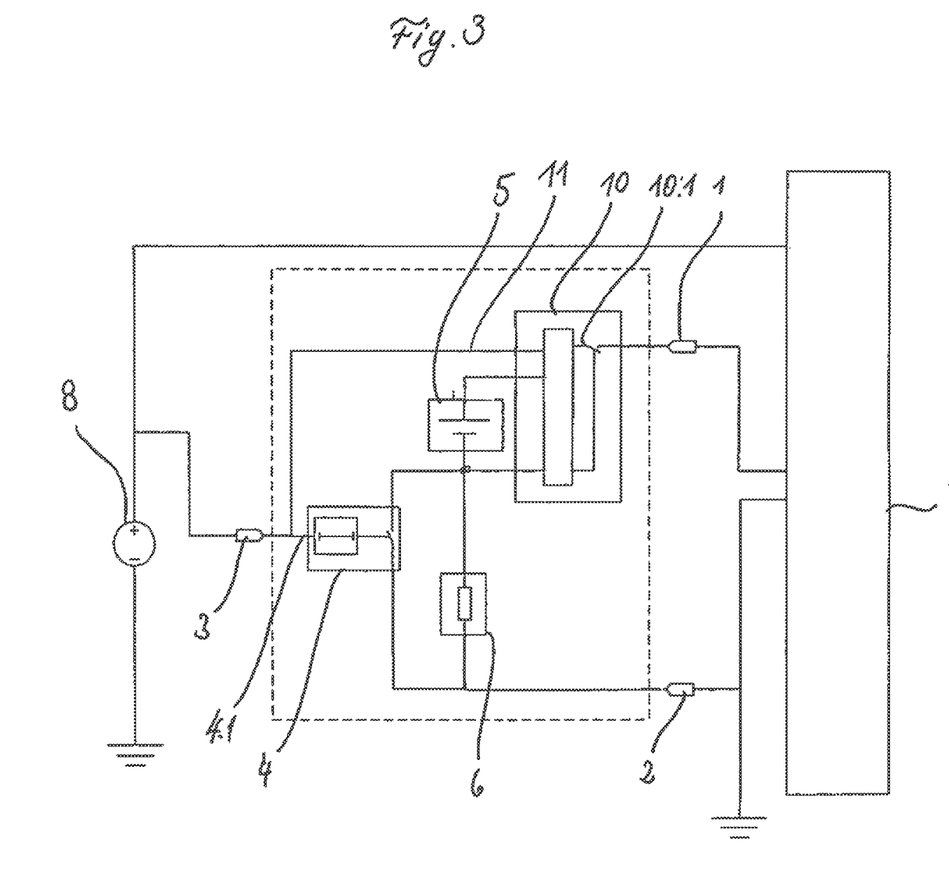
FIG. 3 shows a third exemplary circuit of the battery arrangement with a separate charging element.

FIG. 3 likewise shows an embodiment of the circuit illustrated in FIG. 1A, with the difference that a separate charging element 10 with deep discharge protection 10.1 is provided, which charging element is connected electrically in parallel with the battery 5. In this case, the charging element 10 has an additional electrical connection 11 with a node between the third connection 3 and the first contact 4.1, namely the gate contact. The deep discharge protection 10.1 is formed with a second n-channel MOSFET, which is connected in series between the battery 5 and the first connection 1, wherein the gate contact of said MOSFET is electrically connected to the battery 5. If the voltage of the battery 5 falls below a value which corresponds to a threshold value for a switching operation of the second n-channel MOSFET during battery operation, said MOSFET blocks the current flow from the battery 5 to the electrical load 7, with the result that the battery 5 is not discharged any further. When the first voltage is applied again at the third connection 3, the battery 5 is charged via the additional electrical connection 11.

The circuit arrangement of the charging element 10 can be retrofitted, if required, for example if a previously used non-rechargeable battery is replaced by a rechargeable battery such that the battery can be recharged henceforth.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A battery arrangement for an electrical load in a vehicle configured to carry hazardous material, comprising:
    a battery having at least one first connection electrically connectable to the electrical load;

a first electrical resistor connected electrically in series with the battery and a second connection, the second connection being electrically connectable to the electrical load;

a switch component part connected electrically in parallel with the first electrical resistor and electrically connected to the battery, the switch component part being controllable such that when a first voltage, which can be applied at a third connection, exceeds a presettable value, the switch component part is closed to short circuit the first resistor, and in the case when the first voltage falls below the presettable value, the switch component part is opened to cancel the short circuit; and a delay element configured to delay a switching operation of the switch component part, the delay element being connected electrically in series between a first contact of the switch component part and the third connection and being arranged such that, in the case of a loss of the first voltage, a second voltage is provided that is present at the first contact and is reduceable after a presettable time.

2. The battery arrangement as claimed in claim 1, wherein the switch component part is a semiconductor switching device.

3. The battery arrangement as claimed in claim 2, wherein the semiconductor switching device is a MOSFET in the form of a voltage controlled n channel MOSFET.

4. The battery arrangement as claimed in claim 1, wherein the delay element comprises an RC element, having an electrical resistor connected electrically in series between the third connection and the first contact, and an electrical capacitor connected electrically in parallel with the first contact.

5. The battery arrangement as claimed in claim 4, further comprising a diode connected electrically in series between the third connection and the delay element, the diode blocking an electric current flow in the direction of the third connection.

6. The battery arrangement as claimed in claim 1, wherein the battery is a rechargeable battery.

7. The battery arrangement as claimed in claim 1, wherein the first voltage is applicable to the first connection so that an electric charging current flows to the first connection via the battery, by which electric charging current flows to the battery.

8. The battery arrangement as claimed in claim 1, further comprising a separate charging element having a deep discharge protection, the separate charging element being connected electrically in parallel with the battery.

9. The battery arrangement as claimed in claim 1, wherein the battery, the switch component part and the first resistor are arranged in a housing.

10. The battery arrangement as claimed in claim 9, wherein the housing comprises at least one outer contact element of the first connection, the second connection and the third connection.

11. An electrical system for a vehicle configured to carry hazardous material, the system comprising:
at least one electrical load,
a voltage source, and
a battery arrangement including: a battery having at least one first connection electrically connectable to the electrical load; a first electrical resistor connected electrically in series with the battery and a second connection, the second connection being electrically connectable to the electrical load; a switch component part connected electrically in parallel with the first electrical resistor and electrically connected to the battery, the switch component part being controllable such that when a first voltage, which can be applied at a third connection, exceeds a presettable value, the switch component part is closed to short circuit the first resistor, and in the case when the first voltage falls below the presettable value, the switch component part is opened to cancel the short circuit; and a delay element configured to delay a switching operation of the switch component part, the delay element being connected electrically in series between a first contact of the switch component part and the third connection and being arranged such that, in the case of a loss of the first voltage, a second voltage is provided that is present at the first contact and is reduceable after a presettable time.

12. The electrical system as claimed in claim 11, wherein the voltage source is a vehicle battery and/or a generator.

13. A method for operating a battery arrangement including: a battery having at least one first connection electrically connectable to the electrical load; a first electrical resistor connected electrically in series with the battery and a second connection, the second connection being electrically connectable to the electrical load; a switch component part connected electrically in parallel with the first electrical resistor and electrically connected to the battery, the switch component part being controllable such that when a first voltage, which can be applied at a third connection, exceeds a presettable value, the switch component part is closed to short circuit the first resistor, and in the case when the first voltage falls below the presettable value, the switch component part is opened to cancel the short circuit; and a delay element configured to delay a switching operation of the switch component part, the delay element being connected electrically in series between a first contact of the switch component part and the third connection and being arranged such that, in the case of a loss of the first voltage, a second voltage is provided that is present at the first contact and is reduceable after a presettable time, the method comprising:
a voltage source providing the first voltage for supplying power to the electrical load and applying the first voltage at the third connection, wherein in this case the switch component part is closed and the first resistor is short circuited so that the first voltage present at the first connection forms as a voltage drop across the battery, electrically charging the battery; and
in the event of the loss of the first voltage, opening the switch component part and canceling the short circuit, wherein in this case the battery provides a third voltage so that a current flows which is limited by the first resistor and is used to supply power to the electrical load.

14. The battery arrangement as claimed in claim 9, wherein the housing comprises a cast plastic shell.

* * * * *